(12) United States Patent
Melet (10) Patent No.: US 8,523,444 B2
(45) Date of Patent: Sep. 3, 2013

(54) RING FOR A HYDROSTATIC OR HYDRODYNAMIC BEARING, A HYDRAULIC MACHINE EQUIPPED WITH SUCH A RING, AND A METHOD OF MOUNTING SUCH A RING ON A SHAFT

(75) Inventor: Eric Melet, Moirans (FR)

(73) Assignee: Alstom Renewable Technologies, Grenoble (FR)

( * ) Notice: Subject to any disclaimer, the term of this patent is extended or adjusted under 35 U.S.C. 154(b) by 210 days.

(21) Appl. No.: 13/129,632

(22) PCT Filed: Nov. 16, 2009

(86) PCT No.: PCT/FR2009/052185
§ 371 (c)(1),
(2), (4) Date: May 17, 2011

(87) PCT Pub. No.: WO2010/058114
PCT Pub. Date: May 27, 2010

(65) Prior Publication Data
US 2011/0222802 A1 Sep. 15, 2011

(30) Foreign Application Priority Data
Nov. 18, 2008 (FR) ...................................... 08 57817

(51) Int. Cl.
*F16C 32/06* (2006.01)
*F16C 35/00* (2006.01)
*B25G 3/24* (2006.01)
*F16B 31/00* (2006.01)

(52) U.S. Cl.
USPC ........... 384/100; 384/428; 403/289; 411/14.5

(58) Field of Classification Search
USPC ............... 384/428; 411/14.5, 82.1, 388, 389, 411/539; 403/289, 290
See application file for complete search history.

(56) References Cited

U.S. PATENT DOCUMENTS

| 3,317,254 A | 5/1967 | Satterthwaite |
| 3,549,215 A | 12/1970 | Hollingsworth |

(Continued)

FOREIGN PATENT DOCUMENTS

| DE | 2711938 A1 | 9/1977 |
| GB | 913851 A | 12/1962 |

*Primary Examiner* — James Pilkington
*Assistant Examiner* — Kashif Mohammed
(74) *Attorney, Agent, or Firm* — Dowell & Dowell, P.C.

(57) ABSTRACT

The invention relates to a ring (120) that is intended for being mounted tightly around a shaft of a hydraulic machine to form a portion of a hydrostatic or hydrodynamic bearing. The ring includes at least one first section (122), at least one second section (124) and means (132) for mounting the first and second sections around the shaft. Each section (122, 124) includes two edge surfaces (1223, 1243) connecting the external (1221, 1241) and internal (1222, 1242) radial surfaces thereof. The first section (122) is provided with at least one threaded hole (127) accessible via an edge surface (1223) and capable of receiving a screw (132) projecting from an edge surface (1243) of the second section (124). The screw (132) is provided, on the portion of the shank (134) thereof that projects from the second section (124), with at least one raised pattern (140) for rotatably moving the shank (134) in order to screw or unscrew the shank in the threaded hole (127). The screw (132) is provided with a piston (130) sliding in a recess (128) arranged in the second section (124), connecting to the edge surface (1243) of the second section and isolated from the outside by a bearing (136). The second section (124) is provided with means for supplying pressurized fluid to a chamber ($C_1$) with variable volume arranged between the piston (130) and the bearing (136), inside the recess (128).

10 Claims, 5 Drawing Sheets

(56) References Cited

U.S. PATENT DOCUMENTS

| | | | |
|---|---|---|---|
| 3,738,717 A | 6/1973 | Gardner | |
| 4,142,811 A * | 3/1979 | Burnham | 403/290 |
| 4,428,697 A * | 1/1984 | Ruland | 403/344 |
| 2004/0151538 A1* | 8/2004 | Landwehr | 403/290 |

* cited by examiner

RING FOR A HYDROSTATIC OR HYDRODYNAMIC BEARING, A HYDRAULIC MACHINE EQUIPPED WITH SUCH A RING, AND A METHOD OF MOUNTING SUCH A RING ON A SHAFT

BACKGROUND OF THE INVENTION

1. Field of the Invention

The invention relates to a ring designed to be clamped around a shaft of a hydraulic machine for the purpose of forming a hydrostatic or hydrodynamic bearing. The invention also relates to a hydraulic machine including, inter alia, such a ring. Finally, the invention relates to a method of mounting such a ring on a hydraulic machine shaft for the purpose of forming a portion of a hydrostatic or hydrodynamic bearing.

2. Brief Description of the Related Art

A hydraulic machine comprises a rotary portion, such as a wheel or "runner" of a turbine or of a turbine pump, which wheel is designed to have a forced flow of water pass through it. Such a forced flow is a driving flow when the machine operates as a turbine, and a driven flow when the machine operates as a pump. In such a machine, a radial hydrostatic or hydrodynamic bearing can be provided around a shaft that supports the wheel, with the function of taking up the radial forces to which said shaft is subjected. The radially inner portion of such a bearing is sometimes constituted by a metal ring that forms an interference-fitted band in that it is clamped around the shaft. Such a ring is generally formed integrally as a single piece, i.e. it extends in one piece over 360° around the shaft, thereby ensuring continuity for its radially outer surface that constitutes the radially inner surface of the bearing. The fact that the ring is in one piece is a source of design and assembly constraints.

Multi-part rings made of metal could be devised, such rings being assembled around the shaft by welding or by mechanical means. In order to ensure good continuity and circularity that is as exact as possible for the radially outer surface of such a ring, rectification machining would need to be effected on the ring, once said ring has been assembled around the shaft, after the orifices for passing the assembly means such as bolts have been filled. In practice, such machining operations, to be performed on site would be lengthy and difficult, even though they would not guarantee continuity and circularity for the outside surface of the ring.

In addition, rings made of ceramic exist that cannot be assembled by welding and with which use of mechanical assembly means would induce discontinuities in the material of their outside surfaces. That is why such rings are always made integrally as a single piece, and must therefore be inserted over a hydraulic machine shaft via one end of that shaft which must have transverse dimensions less than the dimensions of the central bore of the ring. This can be problematic when a shaft is provided with lower and upper ends respectively of the "base" and of the "head" type that are enlarged so as to co-operate respectively with a turbine wheel and/or with the inlet shaft of an alternator.

SUMMARY OF THE INVENTION

More particularly, an object of the invention is to remedy those drawbacks by proposing a novel ring that is easier to mount around a hydraulic machine shaft, without inducing significant discontinuity on its radially outer surface, thereby enabling it to constitute the inside portion of a hydrostatic or hydrodynamic bearing without requiring rectification machining.

To this end, the invention provides a ring designed to be clamped around a shaft of a hydraulic machine for the purpose of forming a portion of a hydrostatic or hydrodynamic bearing, said ring being characterized in that: in a circumferential direction, it comprises at least a first segment, at least a second segment, and means for mounting first and second segments around a shaft; in that each segment comprises a radially outer surface, a radially inner surface, and two end faces interconnecting its radially outer and inside surfaces; in that the first segment is provided with at least one tapped hole accessible via one of its end faces and adapted to receive a screw projecting from an end face of the second segment; in that the or each screw is provided, on the portion of its shank that projects relative to the end face of the second segment, with at least one piece in relief for driving the shank in rotation about a longitudinal axis of the shank in order to screw the screw into the tapped hole or in order to unscrew it therefrom; in that the or each screw is provided with a piston slidably mounted in a recess that is provided in the second segment, which recess opens out in the end face of the second segment, and is isolated from the outside by a bearing through which the shank of the screw can slide; and in that the second segment is equipped with means for feeding pressurized fluid to a chamber of variable volume formed between the piston and the bearing, inside the above-mentioned recess.

By means of the invention, the two segments of a ring, forming an interference-fitted band to be mounted around a hydraulic machine shaft, can be assembled together by engaging the shank of each of the screws projecting from the second segment into a corresponding tapped hole in the first segment, and then by driving the screw so as to screw it into the tapped hole by means the piece(s) in relief provided on the shank of the screw. Once this first step has been implemented, it is possible to finalize the clamping of the ring/interference-fitted band around the shaft of the hydraulic machine by injecting a pressurized fluid into each chamber defined in part by the pistons of the screws, thereby exerting a traction force transmitted to the first segment. This presses the end face of the first segment firmly against the end face of the second segment. The structure of the ring is remarkable, in particular, in that the tapped hole and the recess open out in the end faces of the first and second segments so that, when said end faces bear against each other, these hollow volumes do not generate any discontinuity in the radially outer surface of the ring/interference-fitted band. This surface can thus constitute the radially inner surface of a hydrostatic or hydrodynamic bearing, without requiring rectification machining. The fact that the ring is a multi-part ring facilitates design and offers multiple possibilities of use, in particular for renovation or reconditioning work, where the geometrical shape of the turbine shaft is pre-imposed.

In advantageous but non-essential aspects of the invention, a ring such as the above-defined ring may incorporate one or more of the following characteristics, taken in any technically feasible combination:

- A first end face of each segment is provided with at least one tapped hole for receiving a screw projecting from a first end face of the other segment, and a second end face of each segment is provided with a projecting screw for engaging in a tapped hole accessible via the second end face of the other segment. In this aspect of the invention, each segment thus carries tapped holes and screws designed to co-operate with respective ones of the screws and of the tapped holes of the other segment.

Each first segment is provided with a plurality of tapped holes, distributed over the height of its end face, which height is a dimension parallel to a central axis of its radially inner surface, while each second segment is provided with a plurality of projecting screws, the number of which is equal to the number of tapped holes in the first segment, and which are distributed over the height of its end face, which height is a dimension parallel to a central axis of its radially inner surface.

Each piston of a screw is disposed in a dedicated recess and the feed means for feeding the chambers of the various recesses with pressurized fluid are common to at least two such chambers.

The feed means comprise at least one duct interconnecting at least two chambers in which the pistons of respective ones of two distinct screws are disposed.

When the first and second segments are in the assembled configuration, the or each chamber is at least partially filled with a solid material.

Means are provided for feeding pressurized fluid to a second chamber of variable volume that is defined by the piston inside the recess, opposite from the bearing.

The invention also provides a hydraulic machine comprising a rotary member supported by a shaft around which a hydrostatic or hydrodynamic bearing is disposed, said hydraulic machine being characterized in that it further comprises a ring according to any preceding claim that is mounted around the shaft and that defines a radially inner surface of the hydrostatic or hydrodynamic bearing.

Such a machine is easier to install and to maintain than state-of-the-art machines.

Finally, the invention provides a method of mounting a ring on a shaft of a hydraulic machine so as to form a portion of a hydrostatic or hydrodynamic bearing, said method being characterized in that it comprises steps consisting in:

a) bringing together at least one first circumferential segment and at least one second circumferential segment, each of which has a radially outer surface, a radially inner surface and two end faces interconnecting its radially outer and radially inner surfaces, by bringing at least a first end face of the first segment to face a first end face of the second segment;

b) engaging at least one screw projecting relative to the first end face of the second segment into a tapped hole accessible via the first end of the first segment;

c) screwing the screw into the tapped hole by driving it in rotation about a longitudinal axis of its shank, by acting on a piece in relief of the shank that is disposed between the end faces of the first and second segments; and d) injecting a pressurized fluid into a chamber of variable volume defined by a piston integral with or secured to the screw and slidably mounted in a recess provided in the second segment.

By means of the method of the invention, the segments of the ring are assembled in such manner as to be clamped around the shaft of the hydraulic machine, without generating any significant surface discontinuity on the outside of said ring.

In an advantageous aspect of the invention, the pressurized fluid is solidified subsequently to being injected into the chamber of variable volume. The mass of solidified material then holds the piston stationary in a configuration in which the segments making up the ring are clamped around the shaft of the hydraulic machine.

BRIEF DESCRIPTION OF THE DRAWINGS

The invention can be better understood and other advantages of the invention appear more clearly from the following description of an embodiment of a ring of the invention, of an embodiment of a hydraulic machine of the invention, and of an implementation of a mounting method of the invention, the description being given merely by way of example and with reference to the accompanying drawings, in which.

DESCRIPTION OF THE PREFERRED EMBODIMENTS

Figure 1:
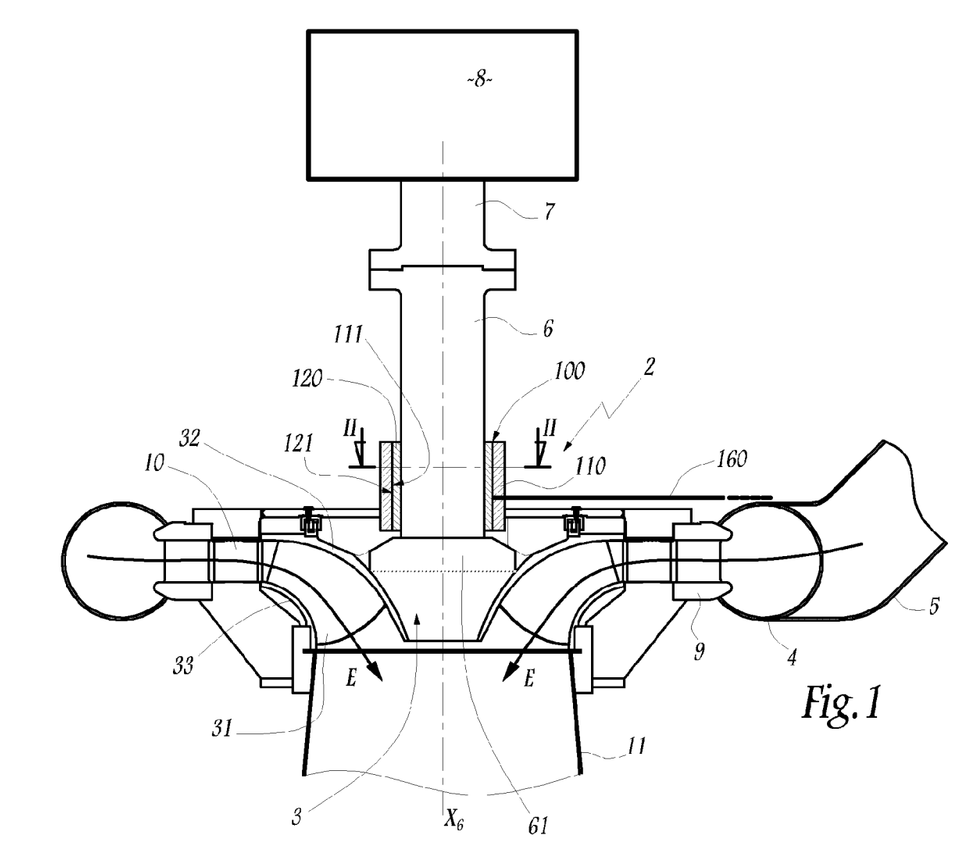
FIG. 1 is an axial section view showing the principle of an installation incorporating a machine of the invention.

The installation 1 shown in FIG. 1 includes a Francis turbine 2 having its wheel or "runner" 3 fed from a casing 4 into which a forced-flow duct 5 opens out.

The turbine 2 also includes a shaft 6 on which the wheel 3 is mounted and that rotates with said wheel about a vertical axis $X_6$ that is also the longitudinal axis of the shaft 6. The shaft 6 is constrained in rotation with another shaft 7 forming a drive member for driving an alternator 8.

Between the casing 4 and the wheel 3 there is disposed a series of stationary guide vanes 9 and of wicket gates 10 having the function of guiding a flow E that is coming from the duct 5 and from the casing 4 and that is to pass through the wheel 3 towards a suction duct 11.

The wheel 3 is provided with blades 31 that extend between a ceiling 32 and a belt 33.

The wheel 3 is fastened to the lower end 61 of the shaft 6 or "base of the shaft". The base 61 of the shaft may be formed integrally with the remainder of the shaft 6, or else be mounted thereon. The wheel 3 is then mounted on the base 61 of the shaft by means that are known per se, such as screws that are not shown.

In order to take up the transverse forces to which the shaft 6 is subjected while the moving portions 3 and 6 of the turbine 2 are rotating about the axis $X_6$, a hydrostatic bearing 100 is formed around the shaft 6, above the base 61 of the shaft.

In a variant, the bearing 100 may be a hydrodynamic bearing.

Said bearing 100 is defined between a stationary lining 110 and a ring 120 forming an interference-fitted band, i.e. clamped around the shaft 6. The lining 110 is stationary in that it does not rotate about the axis $X_6$ while the wheel 3 and the shaft 6 are rotating. The lining 110 is thus stationary relative to the structure of the turbine 2 that comprises, in particular, the elements 4 and 5.

The bearing 100 is defined between the radially inner surface 111 of the lining 110 and the radially outer surface 121 of the ring 120, both of these surfaces being cylindrical, circular, and centered on the axis $X_6$ when the turbine 2 is in the assembled configuration.

A feed line 160 makes it possible to feed clean water under pressure to the interstice corresponding to the bearing 100 between the surfaces 111 and 121, through the lining 110.

In view of the rotation movement between the surface 121 and the surface 111, it is important for the surface 121 to be as continuous as possible and free from any roughness or unevenness.

In order to make it easy to mount around the shaft 6, the ring 120 is made up of two segments 122 and 124 that are assembled together around the shaft 6 while exerting a centripetal force thereon, so that ring 120 constitutes an interference-fitted band for the shaft 6.

The structure of the ring 120 appears from FIGS. 2 to 9.

Figure 2:
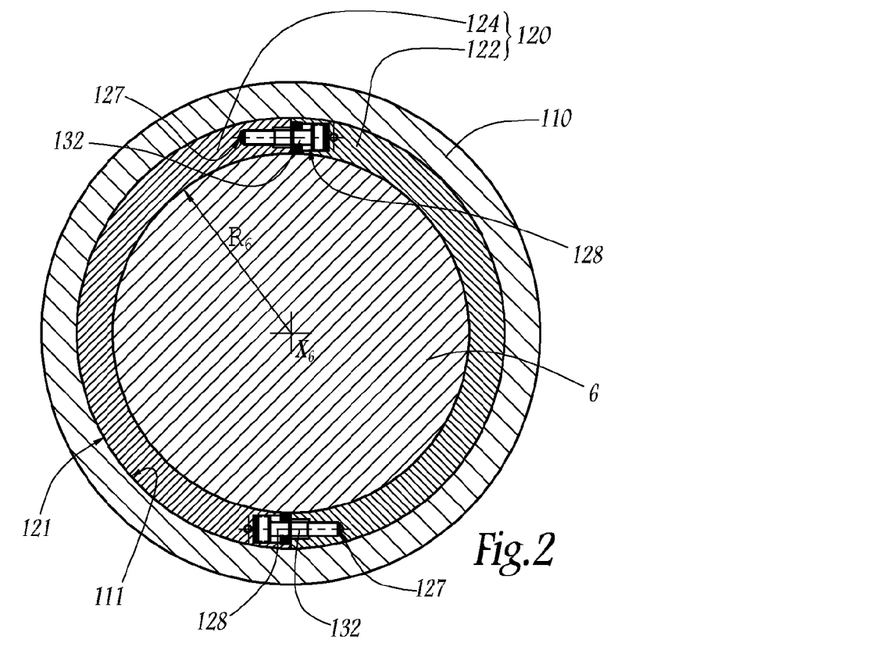
FIG. 2 is a section view on a larger scale on line II-II of FIG. 1.
Figure 3:
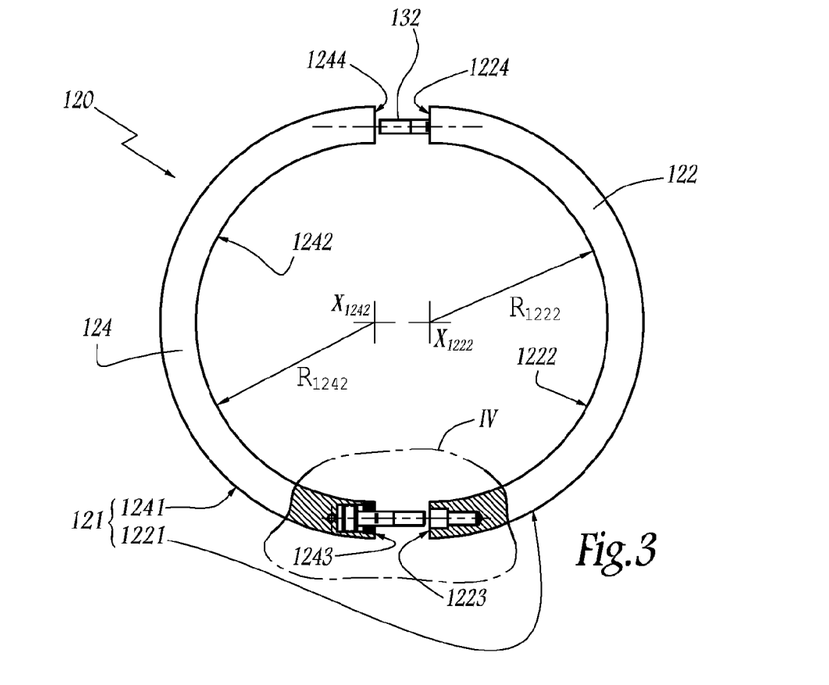
FIG. 3 is a plan view of a two-part ring used in the installation of FIG. 1, shown prior to assembly and partially cut away.

The segment 122 is semi-circular and has a radially outer surface 1221, a radially inner surface 1222 and two end faces 1223 and 1224 respectively interconnecting the surfaces 1221 and 1222. In the same way, the segment 124 is defined between a radially outer surface 1241, a radially inner surface 1242, and two end faces 1243 and 1244 interconnecting the surfaces 1241 and 1242. The surfaces 1221 and 1241 together constitute the surface 121 of the ring 120. The segments 122 and 124 are circumferential in that their inside surfaces 1222 and 1242 are brought into abutment in order to constitute the inside circumferential surface 121 of the ring 120. Each of the surfaces 1222 and 1242 has a radius $R_{1222}$ or $R_{1242}$ equal to, or slightly less than the radius $R_6$ of the shaft 6, in its portion around which the ring 120 is mounted.

The ring 120 is thus clamped on the shaft 6 so as to avoid any relative movement between these elements. The clamping is preferably "light" in that it is not necessarily sufficient to take up seizure torque in the event of failure in the bearing 100. The clamping is defined to take up the expansion effects due to the temperature gradient between the shaft 6 and the ring 120, and the expansion effects due to centrifugal forces. Heating the parts 6, 122, and 124 to a moderate extent facilitates putting the ring 120 into place around the shaft. Seizure torque, which is higher, can be taken up by a cotter pin (not shown) that is disposed between the shaft and the ring.

Figure 4:
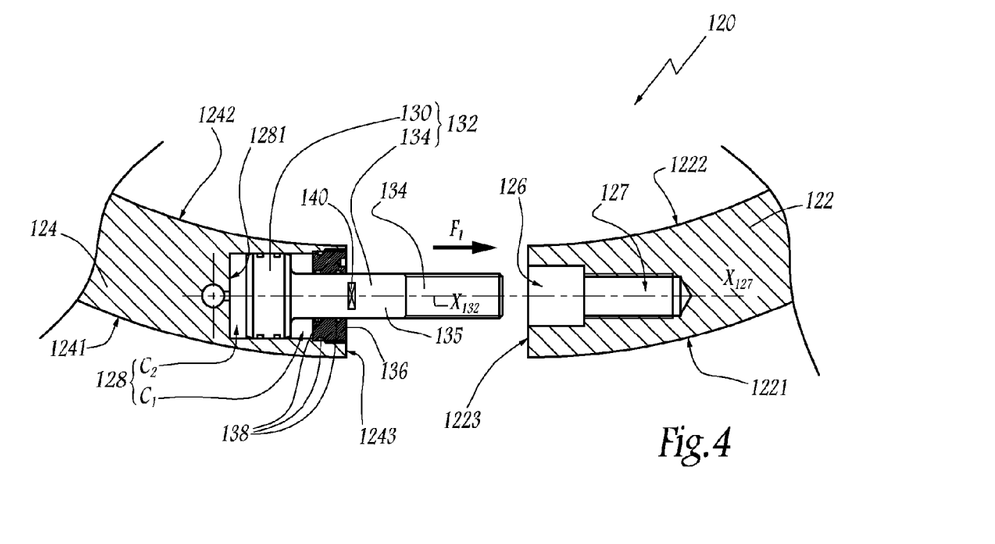
FIG. 4 is a view on a larger scale of the detail IV of FIG. 3.

The segment 122 is provided with a bore 126 that opens out in the end face 1223 and that is extended, at its end opposite from said end face, by a tapped hole 127 that is centered on an axis $X_{127}$ perpendicular to the end face 1223. Thus, the tapped hole 127 is accessible from the end face 1223, through the bore 126, and it can be considered that the tapped hole 127 opens out in the end face 1223, via the bore 126.

In addition, the segment 124 is provided with a recess 128 that opens out in the end face 1243 of said segment and that receives a head 130 in the form of a piston that is part of a screw 132, the shank of which is referenced 134.

The shank 134 of the screw 132 passes through a bearing 136 screwed into the mouth of the recess 128 that it therefore isolates from the outside. The dimensions of the bearing 136 and of the shank 134 are such that said shank can slide in said bearing, along its longitudinal axis $X_{132}$.

Seals 138 seal the interface between firstly the bearing 136 and the rod 134 and secondly the bearing 136 and the segment 124.

Two chambers $C_1$ and $C_2$ are defined on either side of the piston 130 of a screw 32, inside the corresponding recess 128. The chamber $C_1$ is defined between the bearing 136 and the piston 130, while the chamber $C_2$ is defined between the piston 130 and the end-wall 1281 of the recess 128 that is opposite from the bearing 136.

The shank 134 is threaded over a portion of its length, in the vicinity of its end opposite from the head 130. In its intermediate portion 135, situated between its threaded portion and its head or piston 130, the shank 134 is provided with two flats 140 that are diametrically opposite about the axis $X_{132}$. These flats make it possible to drive the shank 134 in rotation about the axis $X_{132}$ when the screw 132 is to be screwed into or unscrewed from the tapped hole 127.

Figure 7:
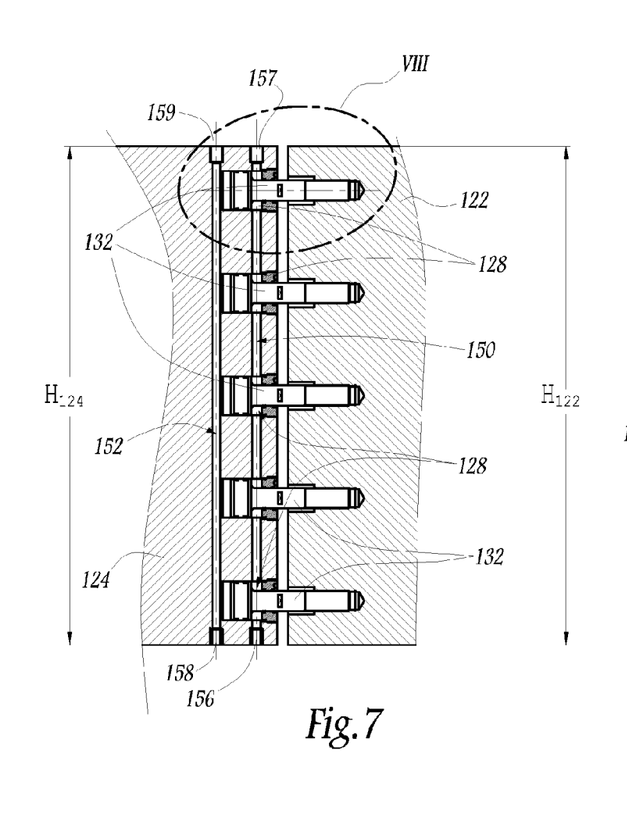
FIG. 7 is a section view on a smaller scale on line VII-VII of FIG. 6.
Figure 8:
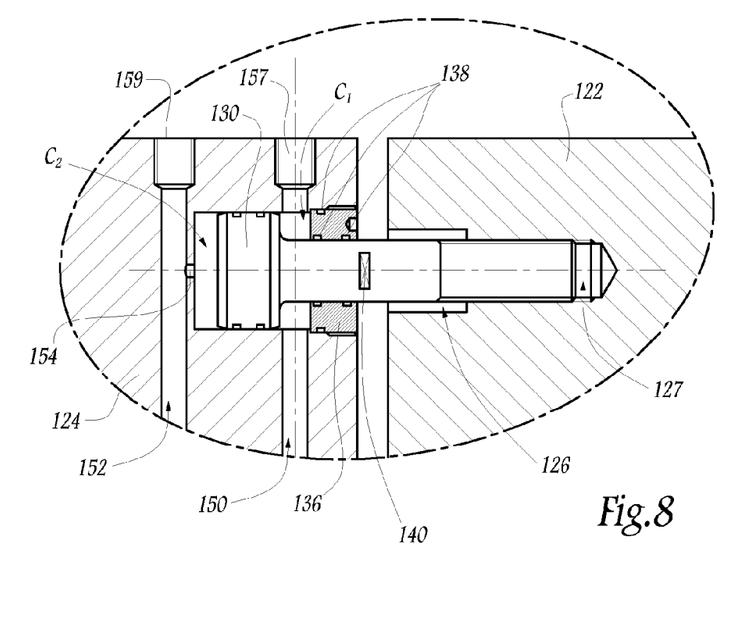
FIG. 8 is a view on a larger scale of the detail VIII of FIG. 7.

As appears more particularly from FIG. 7, the segment 122 is equipped with five bores 126 and with five tapped holes 127 over its height $H_{122}$, i.e. over its dimension parallel to the axis of symmetry $X_{1222}$ of the surface 1222 that coincides with the axis $X_6$ when the ring 120 is in the assembled configuration. In the same way, the segment 124 is equipped with five recesses 128, with five bearings 136 and with five screws 132 that are superposed and that serve to be engaged simultaneously in the bores and recesses 126 and 127 in the segment 122. These recesses 128 are distributed over the height $H_{124}$ of the segment 124, i.e. its dimension parallel to the axis of symmetry $X_{1242}$ of its surface 1242, which axis coincides with the axis $X_6$ when the ring 120 is in the assembled configuration around the shaft 6. The heights $H_{122}$ and $H_{124}$ have the same value.

The number of recesses 128 is adapted to the height $H_{122}$ or $H_{124}$ and to the diameter of the heads 130.

A first duct 150 extends in the segment 124 parallel to the height $H_{124}$. This duct interconnects the chambers $C_1$ of the various recesses 128.

A second duct 152 extends over the height $H_{124}$ of the segment 124, parallel to the segment 150. This duct 152 is connected via tap-offs 154 to each of the chambers $C_2$.

The ducts 150 and 152 are equipped with couplings, respectively 156 and 158, making it possible to feed them with a pressurized fluid, in particular a polymerizable resin. Couplings 157 and 159 equip respective ones of the ends of the ducts 150 and 152 opposite from the couplings 156 and 159 and make it possible to connect these ducts to circuits for removing or recirculating excess pressurized fluid.

In practice, the segment 122 is also equipped, at its end face 1244, with five recesses 128, with five bearings 136, and with five screws 132, while the end face 124 is provided with five bores 126 and with five tapped holes 127. In other words, an interface of the same type as the interface formed between the edge faces 1223 and 1243 is formed at the end faces 1224 and 1244, the structure merely being inverted as regards what belongs to the segment 122 and what belongs to the segment 124.

The segments 122 and 124 are thus identical, which is advantageous in terms of manufacturing and management of the spare parts.

In order to make the drawings clearer, the shaft 6 is not shown in FIGS. 4 to 9.

When the ring 120 is to be assembled around the shaft 6, the segments 122 and 124 are brought around said shaft while putting the end faces 1223 and 1243 face-to-face with each other and while putting the end faces 1224 and 1244 face-to-face with each other. This is the configuration that is shown in FIG. 4 and in which it is possible to move the segment 124 towards the segment 122, in the direction indicated by the arrow $F_1$, parallel to the axes $X_{127}$ and $X_{132}$ that are then aligned, thereby causing the shank to be engaged in the bore 126 and into the start of the tapped hole 127.

Figure 5:
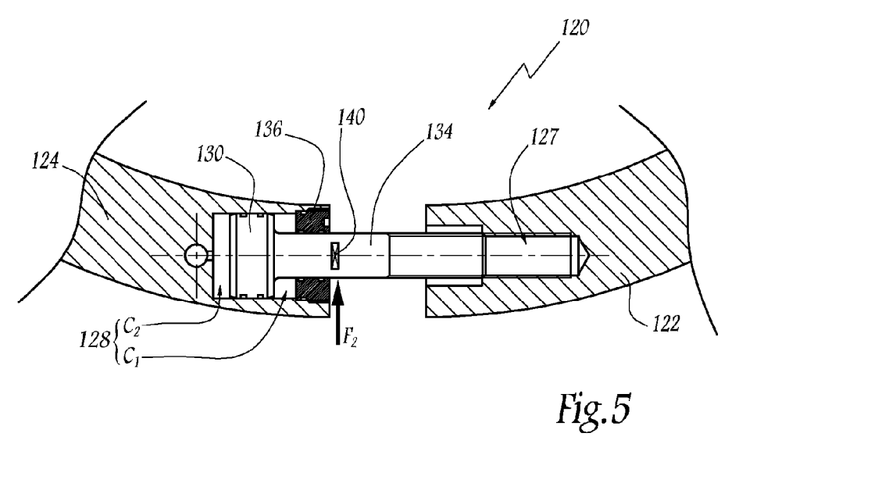
FIG. 5 is a view analogous to FIG. 4, during a first step of assembly of the ring.

In this configuration, shown in FIG. 5, the flats 140 are accessible for a tool, such as a wrench inserted in the direction indicated by the arrow $F_2$ between the end faces 1223 and 1243. This tool makes it possible to drive the shank 134 in rotation about the axis $X_{132}$ in such a manner as to screw the screw 132 into the tapped hole 127. The effect of this is to bring the end faces 1223 and 1243 closer together, until the configuration shown in FIG. 6 is reached.

The same method is used for each of the screws 132 disposed at the end faces 1224.

Figure 6:
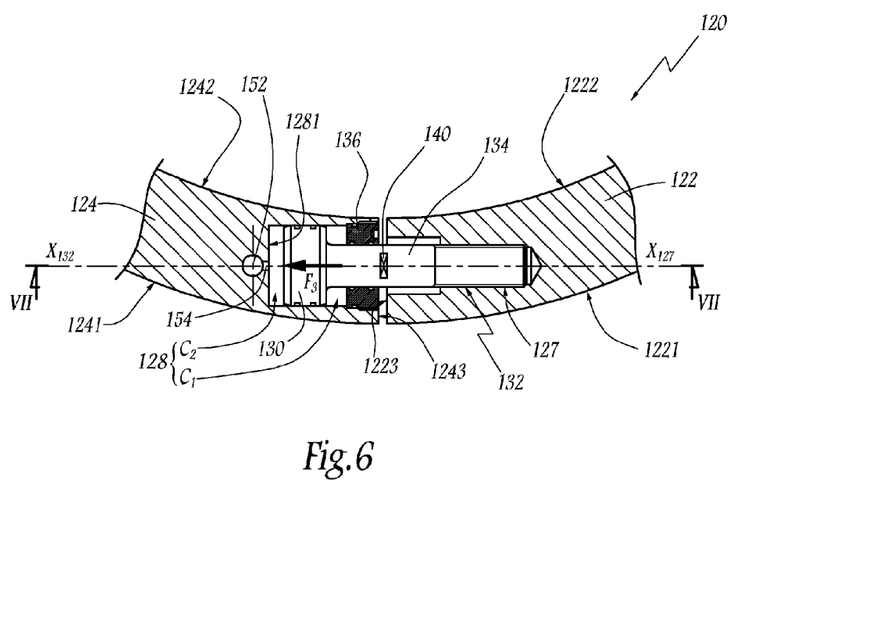
FIG. 6 is a view analogous to FIG. 4, during a second step of assembly of the ring.

In the configuration shown in FIG. 6, a thermosetting resin is injected, under a pressure of about 1500 bars, into the duct 150. This resin spreads around the screw 132, into the various chambers $C_1$ of the segment 124, and its pressure is such that it exerts a force, represented by the arrow $F_3$ on the various pistons 130 that is sufficient to move each piston towards the end wall 1281, until the configuration shown in FIG. 9 is reached in which the end faces 1223 or 1243 are bearing firmly against each other.

While the pistons 130 are moving towards the end faces 1281 of the recesses 128, the air present in the chambers $C_2$ is removed through the tap-offs 154 and through the duct 152.

Figure 9:
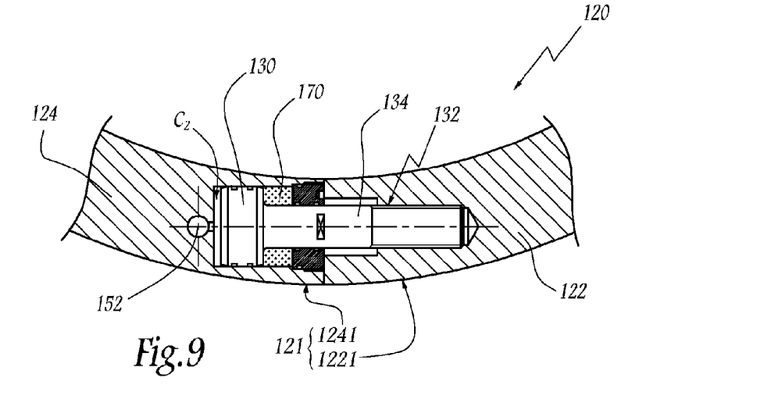
FIG. 9 is a view analogous to FIG. 4 when the ring is in a configuration in which it is clamped around the shaft of the machine shown in FIG. 1.

The feed pressure of the resin is maintained for a length of time sufficient to enable it to polymerize, so that said resin is transformed into a solid mass 170 that locks the pistons 130 in the configuration shown in FIG. 9 and in which the outside surfaces 1221 and 1241 join together without any apparent discontinuity, so that the surface 121 has no significant unevenness;

It can be understood that the chambers $C_1$ are fed with pressurized polymerizable resin simultaneously in the vicinity of the end face 1243 of the segment 124 and in the vicinity of the end face 1224 of the segment 122, so that the segments 122 and 124 are clamped evenly around the shaft 6.

This force is maintained so long as the chambers $C_1$ are filled with polymerized resin. The screws 132 are thus locked "mechanically" in the recesses 126, in a configuration in which the end faces 1223 and 1243 bear against each other and in which the end faces 1224 and 1244 bear against each other. So long as the mass 170 of polymerized resin keeps its properties, the screws 132 cannot be released relative to the recesses 128.

It can sometimes be necessary to remove the ring 120, e.g. for a maintenance operation. In which case, the segments 122 and 124 are heated in the vicinities of the recesses 128, which makes the resin present in the chambers $C_1$ fluid again. It is then possible to inject into the chambers $C_2$ and through the duct 152 and through the tap-offs 154 another pressurized fluid, thereby causing the various pistons 130 to be moved towards the bearings 136, to the extent that the end faces 1223 and 1243 are spaced apart and that the end faces 1224 and 1244 are spaced apart, thereby making the flats 140 accessible again, which enables the screws 132 to be driven in an unscrewing direction relative to the tapped hole 127.

It is thus possible to separate the segments 122 and 124.

During this operation, the resin is removed via the duct 150 and via one of the couplings 156 or 157.

Thus, the invention makes it possible to secure together effectively and lastingly two segments 122 and 124 making up a ring 120, while the radially outer surface 121 of said ring does not have any significant discontinuity because, once the end faces 1233 and 1243 are bearing against each other and the end faces 1224 and 1244 are bearing against each other, the recesses and bores used are masked.

Very advantageously, the clamping force exerted by each screw 132 is exerted in the vicinity of the neutral axis of each of the segments 122 and 124.

In addition, this force can be distributed over the height of the segments 122 and 124, by means of the tapped holes 127 and the recesses 128 being distributed over the height of the segments. This offers a considerable advantage compared with clamping bolts being installed above the top edge and below the bottom edge of a multi-part ring.

The invention is shown for a hydrostatic bearing. However, it is also applicable to a ring forming part of a hydrodynamic bearing.

The invention claimed is:

1. A ring designed to be clamped around a shaft of a hydraulic machine for the purpose of forming a portion of a hydrostatic or hydrodynamic bearing, the ring comprising;
   at least a first segment and at least a second segment, and the first and second segments being mounted around a shaft;
   each of the first and second segments having a radially outer surface, a radially inner surface, and two end faces interconnecting the radially outer and inner surfaces;
   the first segment being provided with at least one tapped hole in a first of the end faces thereof and adapted to receive at least one screw projecting from an end face of the second segment which is aligned with the first end face of the first segment;
   the at least one screw having a shank that projects outward relative to the aligned end face of the second segment and the shank having at least one piece in relief for use for driving the shank in rotation about a longitudinal axis of the shank in order to screw the at least one screw into the tapped hole or in order to unscrew the at least one screw from the tapped hole;
   the at least one screw including a piston slidably mounted in a recess that is provided in the second segment, which recess opens out in the aligned end face of the second segment, and is isolated from the outside by a bearing through which the shank of the at least one screw can slide; and
   the second segment having feed means for feeding pressurized fluid to a chamber of variable volume formed between the piston and the bearing inside the recess.

2. The ring according to claim 1, wherein each of the first and second segments has a first end face which is provided with at least one tapped hole for receiving at least one screw projecting from a second end face of the other segment.

3. The ring according to claim 1, wherein each first segment is provided with a plurality of tapped holes, distributed over a height of the first end face thereof, the height is a dimension parallel to a central axis of the radially inner surface of the first segment, while each second segment is provided with a plurality of projecting screws, a number of which is equal to a number of tapped holes in the first segment, and which are distributed over a height of one of the end faces thereof, the height is a dimension parallel to a central axis of the radially inner surface of the second segment.

4. The ring according to claim 3, wherein the piston of each screw is disposed in a recess in the aligned end of each second segment and wherein the feed means for feeding the chambers of the recesses with pressurized fluid communicate with at least two chambers.

5. The ring according to claim 4, wherein the feed means for feeding pressurized fluid includes at least one duct interconnecting at least two chambers in which the pistons of respective ones of two distinct screws are disposed.

6. The ring according to claim 1, wherein, when the first and second segments are in an assembled configuration, each chamber is at least partially filled with a solid material.

7. The ring according to claim 1, including other feed means for feeding pressurized fluid to a second chamber of variable volume that is defined by the piston inside the recess opposite from the bearing.

8. A hydraulic machine comprising a rotary member supported by a shaft around which a hydrostatic or hydrodynamic bearing is disposed, and a ring according to claim 1 that is mounted around the shaft and that defines a radially inner surface of the hydrostatic or hydrodynamic bearing.

9. A method of mounting a ring on a shaft of a hydraulic machine so as to form a portion of a hydrostatic or hydrodynamic bearing, the method comprising the steps of:
   a) bringing together at least one first circumferential segment and at least one second circumferential segment of the ring, each first and second segment having a radially outer surface, a radially inner surface and two end faces interconnecting the radially outer and radially inner surfaces, by bringing at least a first end face of the first segment to face opposite to a second end face of the second segment;
   b) engaging at least one screw projecting relative to the second end face of each second segment into a tapped hole in the first end face of each first segment;
   c) screwing the at least one screw into the tapped hole by driving it in rotation about a longitudinal axis of the at least one screw, by acting on a piece in relief of the at least one screw that is disposed between the first end face of the first segment and the second end face of the second segment; and
   d) injecting a pressurized fluid into a chamber of variable volume defined by a piston associated with the at least one screw and slidably mounted in a recess provided in the second segment.

10. The method according to claim 9, wherein the pressurized fluid is solidified subsequently to being injected into the chamber of variable volume.

* * * * *